Sept. 23, 1930. L. K. BRAREN Re. 17,811
GEAR TRANSMISSION
Original Filed Nov. 30, 1926 2 Sheets-Sheet 1
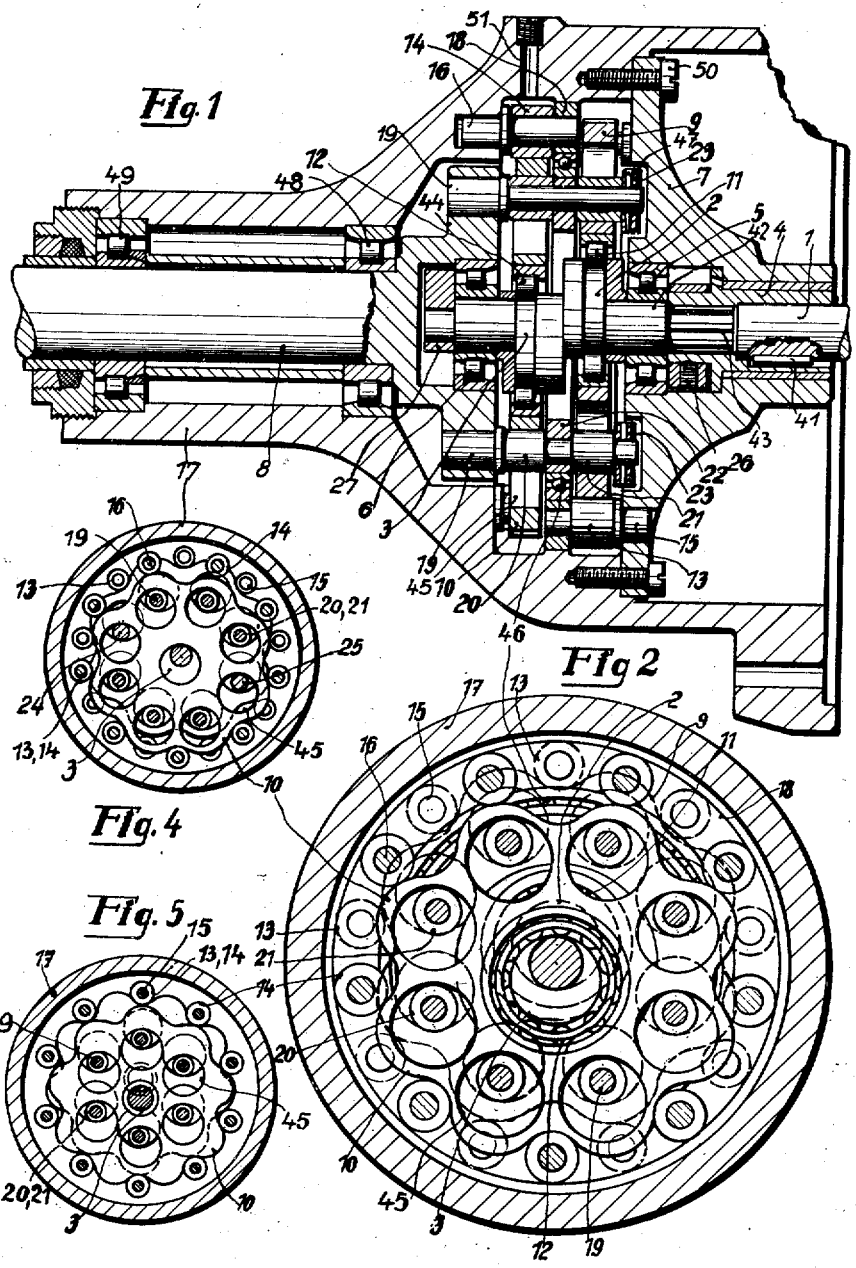
Inventor
Lorenz Konrad Braren
By Crampton & Griffith
his Attorneys Sept. 23, 1930. L. K. BRAREN Re. 17,811
GEAR TRANSMISSION
Original Filed Nov. 30, 1926 2 Sheets-Sheet 2
Fig. 3
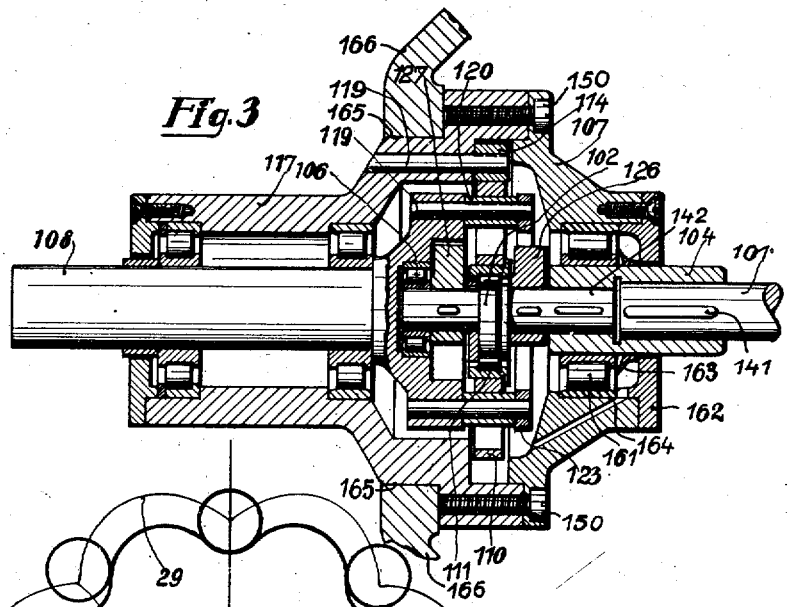
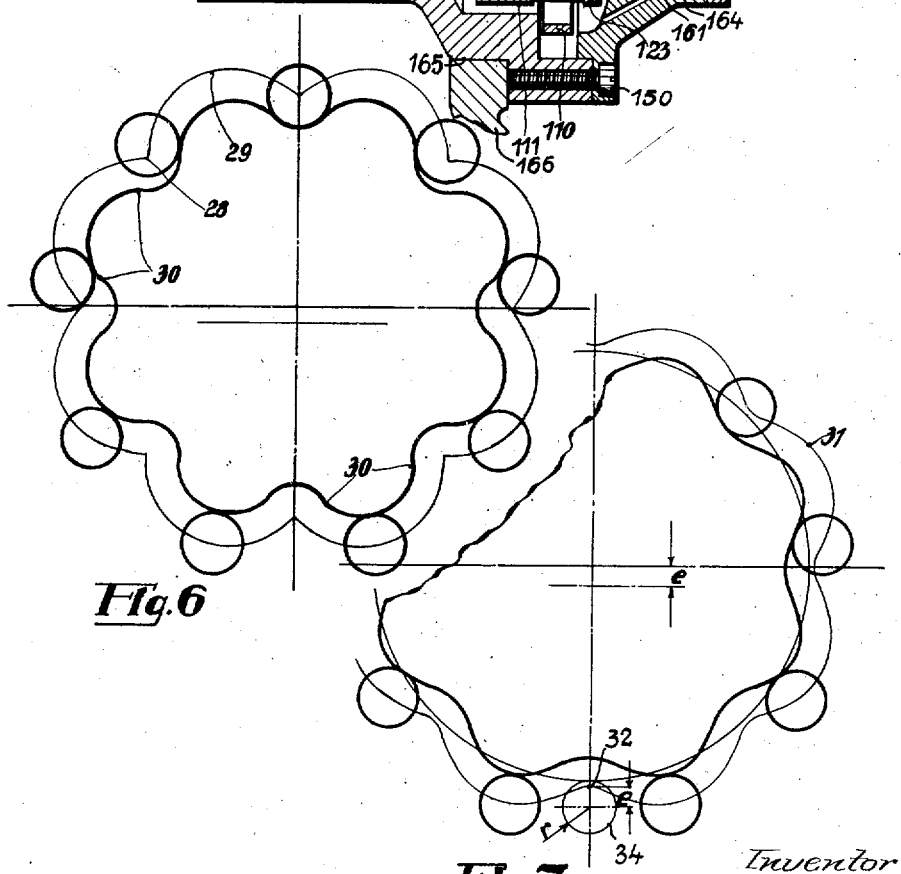
Fig. 6
Fig. 7
Inventor
Lorenz Konrad Braren
By Crampton & Griffith
his Attorneys Reissued Sept. 23, 1930

Re. 17,811

UNITED STATES PATENT OFFICE

LORENZ KONRAD BRAREN, OF MUNICH, GERMANY, ASSIGNOR TO THE FIRM: FRIEDRICH DECKEL, PRÄZISIONSMECHANIK UND MASCHINENBAU, OF MUNICH, BAVARIA, GERMANY

GEAR TRANSMISSION

Original No. 1,694,031, dated December 4, 1928, Serial No. 151,600, filed November 30, 1926, and in Germany December 5, 1925. Application for reissue filed April 24, 1930. Serial No. 447,071.

The invention relates to gear transmissions and has for its object to provide a transmission with a fixed speed ratio of a very simple, compact and durable form. This object is attained by arranging one or a plurality of intermediate discs between the fast and slowly rotating members. This disc is mounted eccentrically on the fast member and is provided on the circumference with a number of teeth to engage with a set of holding members, for instance rollers. The teeth on the circumference form a continuous cycloidal curve or an equidistant to such a curve. The term cycloidal curve is meant to include trochoid, epicycloid, epitrochoid, hypocycloid and hypotrochoid curves. The prolate type of the curve is of special advantage for this purpose as it has no turning point and therefore a more favourable acceleration. The load with the prolate form of the curve furthermore is not transmitted on a single line of the disc during a longer period as is the case with the normal curve.

Another object of my invention is to remove all bending strain from the fast as well as from the slow shaft which object is attained by providing a plurality of intermediate discs disposed angularly to each other to compensate for the bending forces.

Another important object of my invention is to equalize the load of the transmitting pins which is attained by providing a supporting ring on the outside end of the pins and between the intermediate discs in case more than one are used. In case of severely loaded transmissions the ring may be supported radially.

I furthermore make according to my invention all pins of such a diameter that they deflect a trifle under load equalizing thus any possible inaccuracies in the form of the curve or in the location of the pins.

Another object of my invention is to provide transmitting pins of the same number as there are teeth in the intermediate disc in order to attain a very compact construction. When using a plurality of discs the number of teeth must be divisible by the number of discs in order to be able to locate the bores for the transmitting pins in the teeth.

The above and various other important improvements will be hereinafter fully described and claimed. In order that this my invention may be more readily understood reference is made to the accompanying sheets of drawings which show how the invention may be carried into practical effect.

Fig. 1 is a longitudinal section of a gear transmission with two intermediate plates.

Fig. 2 is a cross section of the transmission shown in Figure 1.

Fig. 3 is a longitudinal section of a transmission with one intermediate plate.

Fig. 4 is a cross section of a transmission as shown in Figure 2 but with special holding means for the equalizing ring.

Fig. 5 shows a different arrangement of the transmitting pins and a single set of holding members for two intermediate discs.

Fig. 6 shows the use of an epicycloid for the teeth on the disc.

Fig. 7 shows the disc with a prolate trochoid.

Referring to the Figures 1 and 2 the fast rotating shaft 1 which for instance may be the shaft of an electromotor is fastened by a key 41 to a bushing 4 which is journaled in a bore of the cover 7. A crank shaft 42 fastened to the bushing 4 by a number of key like projections 43 has two cranks 2 and 3 disposed at 180° to each other. The crankshaft 42 is journaled in two roller bearings 5 and 6 of which the first is supported by the cover 7 while the latter is carried by the slowly rotating shaft 8. Two intermediate discs 9 and 10 are mounted on roller bearings 11 and 12 to turn freely on the cranks 2 and 3.

The discs 9 and 10 are fashioned on the circumference with a number of teeth the exact shape of which will be described later. The teeth stand in engagement with rollers 13 and 14 turnably mounted on pins 15 and 16. The pins 15 are fastened in the cover 7 while an equal number of pins 16 are fastened in the housing 17. The number of rollers in engagement with each disc differs by one from the number of teeth. The shape of the curve and the direction of rotation is determined by this relation. An epicycloid or epitrochoid is required when the number of the holding members 14 exceeds the number of teeth by one. The crankshaft 42 and the slowly rotating shaft 8 in this case rotate in opposite directions. When however the number of the holding members 14 is smaller by one than the number of teeth an hypocycloid or hypotrochoid is required. Both shafts rotate in this case in the same direction. For transmitting the turning moment from the discs to the slowly rotating shaft or vice versa there are provided a number of pins 19 fastened in a flange 44 of the slow shaft 8. Holes 45 in identical number with the pins are bored in the discs. For heavy service the number of the holes 45 in the discs should correspond to the number of teeth as it thus becomes possible to locate the holes in the teeth whereby the radius of the pins from the centerline is increased and the load on the pins correspondingly decreased. Where size is not of great importance the disc may be made larger in diameter and a different number of holes 45 be provided than there are teeth (see Figure 5). The rollers 13 and 14 in this case may be arranged on a single pin 15. To reduce the friction of the pins in the holes 45 rollers 20 and 21 are interposed. The diameter of the holes 45 is equal to the diameter of the rollers 20 plus twice the eccentricity of the cranks. The pins 19, 15 and 16 are dimensioned to deflect slightly under the load so as to equalize any inaccuracies of manufacture.

In order to distribute the load equally on all pins rings 18, 22 and 23 are provided. The ring 18 supports the free ends of the pins 15 and 16 which latter are spaced half a division apart in relation to each other. The ring 22 is arranged between the two discs 9 and 10 and may be supported radially in a ball bearing 46 for very heavy service. Another mode of supporting the rings 22 and 23 is shown on Figure 4 where two pins 24 and 25 a trifle smaller than the diameter of the rollers 20 carry the rings. Normally such a support is not necessary. The ring 23 finally is located over the ends of the pins 19, crosspins 47 holding the rings and the rollers 20 axially.

Counterweights 26 and 27 on the fast sleeve 4 and on the crankshaft 42 form a couple to compensate for the couple caused by the discs 9 and 10.

The slow shaft 8 is supported radially and held axially by two roller bearings 48 and 49 in the housing 17. The cover 7 is fastened by screws 50 to the housing 17 forming thus an oil- and airtight container. Two openings 51 are provided of which one only is shown, the one for filling with lubricant and the other for determining the oil level. The housing may be shaped to serve as end plate for an electromotor, the armature shaft being supported by the cover 7.

The transmission shown in Figure 3 uses only one intermediate disc and is especially suitable for light and medium service. Corresponding parts are designated with identical numbers as in the Figures 1 and 2 increased by one hundred. The fast sleeve 104 is supported in a ball bearing 161 which is held in place in the cover 107 by an end plate 162. A dash ring 163 held frictionally on the sleeve 4 throws off any lubricant passing through the roller bearing, a passage 164 permitting it to return to the oil chamber. The counterweights 126 and 127 are arranged on both sides of and close to the single intermediate disc 110. The housing 117 is turned down on the outside to form a seat 165 for fastening the complete gear to an end plate 166 of an electromotor or to a suitable bracket.

In the Figures 6 and 7 the shape of two different curves for the intermediate disc are shown of which the curve on Figure 6 is the equidistant to an epicycloid 29 and the curve on Figure 7 the equidistant to a prolate epitrochoid 31. The points 30 on the equidistant have to carry the load during a longer time than the rest of the curve due to the reversal of the curve 29 in the points 28. This disadvantage is entirely removed in a prolate trochoid where the distance $e$ of the tracing point 32 from the center is about equal to ¾ of the radius $r$ of the rolling circle as indicated by 34. The distance $e$ of course must correspond exactly with the eccentricity of the crank. A method and means for producing such curves is described in my copending application, production of cycloidal curves, Serial No. 151,799, filed November 30, 1926.

Having now particularly described and ascertained the nature of my said invention I do not wish to be understood as limiting myself to the exact details of construction as obviously many modifications will occur to a person skilled in the art.

What I claim is:

1. In a gear transmission a fast rotating member, a slowly rotating member, an eccentric on said fast rotating member, a disc mounted to turn on said eccentric, the circumference of said disc forming a continuous cycloidal curve, members to engage with said cycloidal curve, and means for connecting said disk and said slowly rotating member.

2. In a gear transmission a fast rotating member, a slowly rotating member, an eccentric on said fast rotating member, a disc mounted to turn on said eccentric, the circumference of said disc forming the equidistant to a continuous cycloidal curve, members to engage with said equidistant, and means for connecting said disk and said slowly rotating member.

3. In a gear transmission a fast rotating member, a slowly rotating member, an eccentric on said fast rotating member, a disc mounted to turn on said eccentric, the circumference of said disc forming the equidistant to a continuous epitrochoidal curve, members in engagement with said equidistant, and means for connecting said disk and said slowly rotating member.

4. In a gear transmission a fast rotating member, a slowly rotating member, an eccentric on said fast rotating member, a disc mounted rotatably on said eccentric, the circumference of said disc forming the equidistant to a continuous prolate epitrochoid of which the distance of the generating point from the center of the rolling circle equals about ¾ of the radius of the rolling circle, members in engagement with said equidistant, and means for connecting said disk and said slowly rotating member.

5. In a gear transmission a fast rotating member, a slowly rotating member, two eccentric portions on said fast member, disposed at 180° to each other, two discs one on each eccentric portion for removing any bending strain from said fast rotating member, the circumference of said discs forming a continuous cycloidal curve, members in engagement with said discs, and means for connecting said disk to said slowly rotating member.

6. In a gear transmission a fast rotating member, a slowly rotating member, a plurality of eccentric portions on said fast rotating member, a plurality of discs one on each eccentric portion, the circumference of each disc forming a continuous cycloidal curve, stationary members in engagement with said discs, and a plurality of dogs fastened in said slowly rotating member for transferring the load between said discs and said slowly rotating member.

7. In a gear transmission a fast rotating member, a slowly rotating member, a plurality of eccentric portions on said fast rotating member, a plurality of discs, arranged rotatably one on each said eccentric portion, the circumference of each disc forming a continuous cycloidal curve, stationary members in engagement with said discs, and a plurality of dogs fastened in said slowly rotating member for transmitting the load between said discs and said slowly rotating member, the number of teeth on each disc a multiple of the total number of discs employed and the number of dogs in identical number with the number of teeth on the discs.

8. In a gear transmission a fast rotating member, a slowly rotating member, an eccentric portion on said fast rotating member, a disc rotatable on said eccentric, the circumference formed with a continuous cycloidal curve, members in engagement with said cycloidal curve, and dogs in engagement with said disc said dogs dimensioned to permit of slight deflections for equalizing any inaccuracies.

9. In a gear transmission a fast rotating member, a slowly rotating member, an eccentric portion on said fast rotating member, a disc rotatable on said eccentric, the circumference an equidistant to a continuous cycloidal curve, rolling members in engagement with said curve, and pins for said rolling members of such size as to permit of slight deflections for equalizing any inaccuracies.

10. In a gear transmission a fast rotating member, a slowly rotating member, an eccentric portion on said fast rotating member, a disc rotatable on said eccentric with the circumference a continuous cycloidal curve, stationary members in engagement with said cycloidal curve, a plurality of dogs fastened in said slowly rotating member, said dogs transmitting the turning moment between said slowly rotating shaft and said disc, and a supporting ring for said dogs.

11. In a gear transmission a fast rotating member, a slowly rotating member, a plurality of eccentrics on said fast rotating member, a plurality of discs rotatable one each on said eccentrics, the circumference of said discs forming a continuous cycloidal curve, stationary members in engagement with said cycloidal curves, a plurality of dogs transmitting the turning moment between said slowly rotating shaft and said discs, and a plurality of rings for supporting said dogs.

12. In a gear transmission, the combination with a driving member, of a transmission member rotatably and eccentrically mounted on said driving member, said transmission member having a toothed portion, a plurality of pockets in said transmission member, each of said pockets extending partially into one of the teeth of said toothed portion, a plurality of members rotatable relative to each other and to said driving member, means on one of said plurality of members for engaging the toothed portion of said transmission member, and means on another of said plurality of members for engaging the pockets in said transmission member.

13. In a gear transmission, the combination with a fast rotating member, of a slowly rotating member, an eccentric portion on said fast rotating member, engaging means mounted to turn on said eccentric portion, other engaging means to engage with said engaging means on the eccentric portion, one of said engaging means comprising a curved surface forming substantially an equidistant to a prolate trochoid, and means operatively connecting the engaging means on the eccentric portion with said slowly rotating member.

14. In a gear transmission, the combination with a fast rotating member, of a slowly rotating member, an eccentric portion on said fast rotating member, engaging means mounted to turn on said eccentric portion, stationary engaging means for cooperation with said first named engaging means, one of said engaging means comprising a curved surface forming substantially an equidistant to a prolate trochoid and the other of said engaging means comprising means for contacting with said curved surface at a plurality of spaced points, and an operative connection between said engaging means on said eccentric portion and said slowly rotating member.

15. In a gear transmission, the combination with a fast rotating member, of a slowly rotating member, an eccentric portion on said fast rotating member, engaging means mounted to turn on said eccentric portion, engaging means for cooperation with said first named engaging means, one of said engaging means comprising a curved surface forming substantially an equidistant to a continuous prolate trochoid and the other of said engaging means comprising means for contacting with said curved surface at a plurality of spaced points, and an operative connection between one of said engaging means and said slowly rotating member.

LORENZ KONRAD BRAREN.